United States Patent [19]
Assaf

[11] Patent Number: 4,819,447
[45] Date of Patent: Apr. 11, 1989

[54] METHOD AND MEANS FOR CONTROLLING THE CONDITION OF AIR IN AN ENCLOSURE

[75] Inventor: Gad Assaf, Rehovot, Israel

[73] Assignee: Geophysical Engineering Company, Seattle, Wash.

[21] Appl. No.: 479,009

[22] Filed: Mar. 25, 1983

Related U.S. Application Data

[63] Continuation-in-part of Ser. No. 377,368, Jul. 30, 1982, abandoned.

[51] Int. Cl.$^4$ ............................................. F25D 23/00
[52] U.S. Cl. ........................................... 62/271; 62/92
[58] Field of Search ................... 62/92, 304, 309, 311; 98/33 A; 47/17

[56] References Cited

U.S. PATENT DOCUMENTS

| | | | |
|---|---|---|---|
| 1,919,781 | 7/1933 | Forrest et al. | 62/92 X |
| 4,265,300 | 5/1981 | Kurimoto | 98/33 A X |

Primary Examiner—Henry A. Bennet
Attorney, Agent, or Firm—Sandler & Greenblum

[57] ABSTRACT

The air in a greenhouse is dehumidified using a direct-contact heat exchanger utilizing concentrated brine. The diluted brine produced when water vapor in the greenhouse condenses on the concentrated brine is regenerated in a fuel-fired boiler whose products of combustion, carbon dioxide and water vapor, are passed into the greenhouse. The products of combustion provide the desired level of carbon dioxide in the greenhouse; and the excess water vapor in the products of combustion as well as a significant portion of the water vapor produced by plants, growing in the greenhouse are removed by the hygroscopic concentrated brine.

2 Claims, 1 Drawing Sheet

METHOD AND MEANS FOR CONTROLLING THE CONDITION OF AIR IN AN ENCLOSURE

RELATING APPLICATION

This application is a continuation in part of application, Ser. No. 377,368, file July 30, 1982 which is hereby incorporated by reference (now abandoned), and which is the parent application of Ser. No. 738,544 filed May 28, 1985 (now U.S. Pat. No. 4,707,995).

TECHNICAL FIELD

This invention relates to a method of and means for controlling the condition of air in an enclosure, and more particularly for controlling the temperature and humidity of air in an enclosure such as a greenhouse.

BACKGROUND OF THE INVENTION

Agricultural products, such as vegetables and flowers, are grown on a large scale in greenhouses throughout the world. During daylight hours, growing agricultural products introduce water vapor into the greenhouse and extract carbon dioxide from the air. The growth of such products is enhanced when excess carbon dioxide is introduced into the greenhouse during daylight hours. This can be accomplished, particularly if heat is needed during the day, by burning LP or natural gas and passing the products of combustion directly into the greenhouse. Water heated by burning the fuel can be stored during the day to provide a reservoir of heat that can be released during the night time to heat the greenhouse. The primary deficiency of this approach is the water vapor contained in the flue gases. When this water vapor is added to the water vapor produced by the the growing agricultural products, saturated or nearly saturated conditions are created within the greenhouse. This condition of high humidity produces undesirable stress on all but tropical plants, and increases susceptibility the plants to various diseases which require periodic spraying or other treatment. As a consequence, considerable resistance has been encountered in applying this approach to greenhouse management.

It is therefore an object of the present invention to provide a new and improved method of and apparatus for controlling the condition of air in an enclosure such as a greenhouse, where the disadvantages of the prior art are substantially overcome or reduced.

BRIEF DESCRIPTION OF THE INVENTION

In accordance with the present invention, the air in a greenhouse is dehumidified using a direct-contact heat exchanger utilizing concentrated brine. The diluted brine produced when water vapor in the greenhouse condenses on the concentrated brine is regenerated in a fuel-fired boiler whose products of combustion are passed into the greenhouse. The products of combustion provide the desired level of carbon dioxide in the greenhouse; and the excess water vapor in the products of combustion as well as a significant portion of the water vapor produced by the plants growing in the greenhouse are removed by the hygroscopic concentrated brine. Thus the relative humidity of the air in the greenhouse can be closely controlled by controlling the concentration of the brine, the size of the direct-contact heat exchanger, and the mass flow of air passing over the heat exchanger.

The heating of the diluted brine in the boiler produces steam that is available to heat the interior of the greenhouse, if this is necessary; or the steam can be used for other purposes. Thus, the steam, as it is produced, can be piped directly to a closed heat exchanger within the greenhouse to warm the air therein; or the steam can be condensed to provide fresh water if the greenhouse is in an arid climate. Alternatively, the steam can be piped to a heat storage tank to provide hot water that can be circulated into a heat exchanger in the greenhouse during the night if heat is needed only at night. Preferably, a heat exchanger is provided by which the concentrated brine produced by the boiler is tranferred to the diluted brine before it enters the boiler.

DESCRIPTION OF DRAWINGS

Embodiments of the invention are shown in the accompanying drawings wherein.

DETAILED DESCRIPTION

Figure 1:
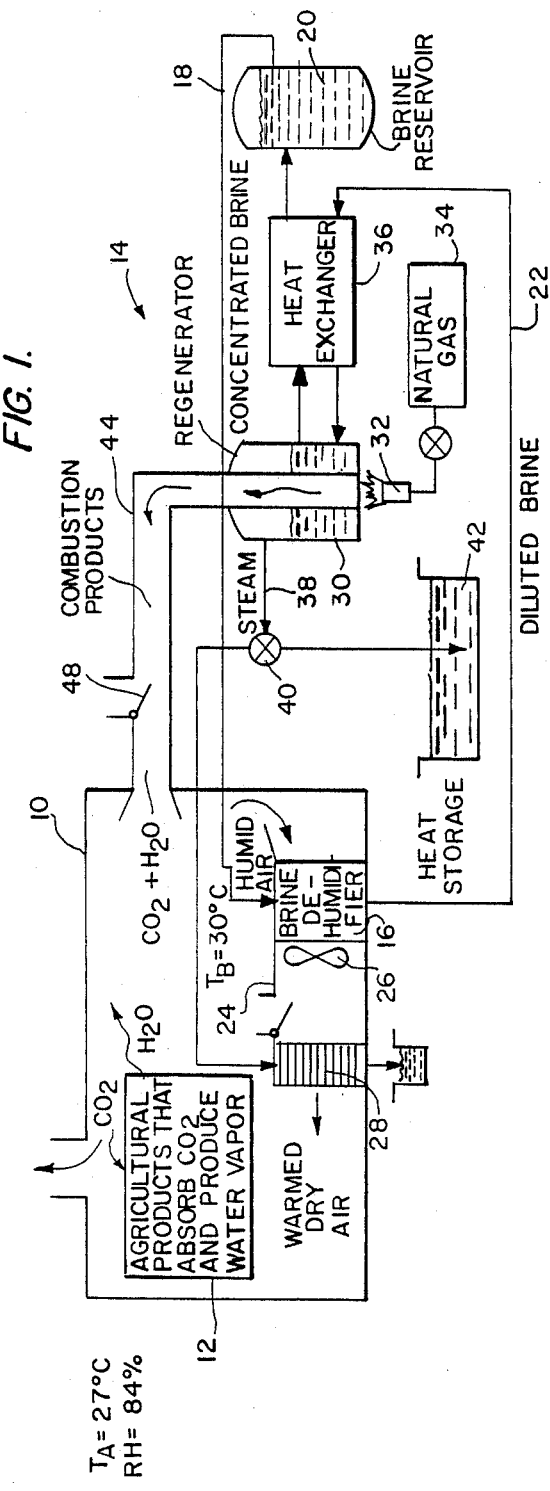
FIG. 1 is a schematic block diagram illustrating the method of and apparatus for controlling the condition of air in a greenhouse in accordance with present invention.

Referring now to the drawing, reference numeral 10 designates a greenhouse containing agricultural products 12 that absorb carbon dioxide during daylight hours and produce water vapor. At night, products 12 are quiescent. Associated with greenhouse 10 is apparatus 14 according to the present invention. Apparatus 14 comprises direct-contact brine dehumidifier 16 to which concentrated brine is supplied by a conduit 18 from brine reservoir 20, and from which diluted brine is obtained by conduit 22. Dehumidifier 16 comprises a felt pad or mate of jute material that provides a large surface area over which the concentrated brine is fed to form a thin film of brine exposed to the air. Thus, dehumidifier 16 operates as a thin film, direct-contact heat exchanger as described below.

Duct 24 contained within greenhouse 10, and within which brine dehumidifier 16 is located, provides means for recirculating air in the greenhouse through the dehumidifier. Specifically, duct 24 contains fan 26 which draws humid air in the greenhouse through the dehumidifier and causes the air to pass through heat exchanger or radiator 28 before the air is reintroduced into the greenhouse.

Boiler 30, associated with brine reservoir 20 is heated by fuel burned in burner 32 which is connected to source 34 of fuel. Diluted brine from conduit 22 is pumped, or flows by gravity, through counter-flow heat exchanger 36 and enters boiler 30 where it is regenerated by being heated. The boiler concentrates the diluted brine by evaporating water therefrom producing steam. Conduit 38 carries the steam to valve 40 which selectively directs the steam into radiator 28 (if the greenhouse must be heated), or into water tank 42 when the heat in the steam must be stored for use at a later time.

Boiler 30 thus concentrates the diluted brine; and the concentrated brine passes through heat exchanger 36 into brine reservoir 20. The hot, concentrated brine produced by the boiler is cooled in heat exchanger 36 before being delivered to brine reservoir 20; and heat extracted from the concentrated brine is transfered to the incoming diluted brine.

Preferably, the fuel burned in burner 32 is liquified petroleum gas or natural gas in order to limit the products of combustion to carbon dioxide and water vapor. The products of combustion produced by the burned fuel associated with burner 30 are piped by a ductwork 44 into greenhouse 10 such that the products of combustion, namely carbon dioxide and water, are transfered into the greenhouse.

During daylight hours, when the agricultural products such as flowers or vegetables are growing, they actively absorb carbon dioxide in the air in the greenhouse. The active agricultural products also give off water vapor which adds to the water vapor introduced into the greenhouse by the products of combustion. In the absence of steps to the contrary, an almost saturated condition will result; and the purpose of brine dehumidifier 16 is to dehumidify the air within the grenhouse. Additionally, dehumidifier 16 serves to increase the temperature of the air in the greenhouse in a manner explained below. Effectively, dehumidifier 16 is designed to maintain a humidity within the greenhouse at a level below 85%, and preferably between 80 and 85%. As explained below, the humidity of the air will be a function of the concentration of brine in the dehumidifier, the effective area of the brine dehumidifier and the mass flow therethrough.

If it is desirable, steam from boiler 30 can be introduced into heat exchanger 28 for purposes of further increasing the temperature in the air and in the greenhouse, or valve 40 can be selectively operated to direct the steam into water tank 42. At night, when excess carbon dioxide is not needed in the greenhouse, the operation of boiler 30 can be suspended; and the heat stored in water tank 42 as a consequence of daytime operation of the boiler to produce carbon dioxide. Alternatively, the steam produced by the boiler can be directed into a network of pipes buried in the ground beneath the greenhouse thus storing the heat in the ground. When the greenhouse is based on hydrophonic operation, the steam produced by the boiler can be used to heat the liquids that are used in the hydrophonic process.

Dehumidifier 16 may be conventional in sense that it is a direct contact heat exchanger in which concentrated brine is applied to a felt, jute or paper mat as a thin film.

Alternatively, the mat may be a capillary web through which the brine flows slowly. The vapor pressure of concentrated brine is small as compared with the saturated vapor pressure of water at the same temperature. When concentrated brine is exposed to the air in the greenhouse, water vapor in the air condensers on the brine. The latent of condensation supplied to the brine during evaporation of water vapor heats the brine film; and the heated brine transfers its heat to the air flowing over the brine. This is an isentropic process in which the temperature of the brine remains substantially constant as the air is warmed and dried in passing through the dehumidifier.

If the temperature in the greenhouse during the day is 27 deg. C., and if the brine temperature is about 30 deg. C both entering and leaving the dehumidifier, a flow rate of about 1.5 cu.m per hour per 1000 sq.m of a greenhouse would be required in order to maintain a rate of humidity of about 84% within the greenhouse. This arrangement provides about about 200 kWh per 1000 sq.m. of greenhouse area of heating during daylight hours assuming that the brine concentration changes from about 50% concentration to about 30% concentration within the dehumidifier. At night, the flow rate of the brine can be reduced to a level that just keeps the mat wet. This would provide additional dehumidification at night. To obtain the high concentration brine, calcium chloride is the preferred salt; but other salts such as magnesium or mixtures of salts can be used. Dead Sea and brine can also be used. The fuel required to regenerate the brine and provide carbon dioxide during the day would be about 10 kg/1000 sq.m. of greenhouse area which will provide about 10 hours of operation per day. In some environments, the operation can be carried out only for 3 to 4 hours during the day because the temperature within the greenhouse will become excessive so far as the agricultural products are concerned. This requires either the shutdown of the system or the introduction of outside air into the greenhouse.

To provide suitable control over the operation of the system shown in FIG. 1, duct 44 may be provided with an adjustable butterfly valve 48 for controlling the rate in which the products of combustion are admitted into greenhouse 10 and a suitable valve (not shown) may be provided in duct 24 and in the greenhouse itself for purpose of controlling the flow air into the duct and into the greenhouse respectively.

The present invention is also usable in drying agricultural product, such as tobacco. In such case, the products of combustion are discharged directly to the atmosphere bypassing the enclosure. The heat in the steam produced during regeneration of the brine can be saved and used for drying the agricultural products—or used by the consumer. For example, if the drier requires a temperature of 73 deg C. and a humidity of 77%, the dehumidifier can deliver air at 88 deg C. with a humidity of 25%. To achieve this, the temperature of the concentrated brine entering the dehumidifier should be about 92 deg C. The vapor pressure of brine of density 1.5 at this temperature is only about 20% of the vapor pressure of water at this temperature, An airflow rate of only about 1 kg/sec of air will remove vapor at the rate of 7 gm/sec or 15 KW of heat.

Figure 2:
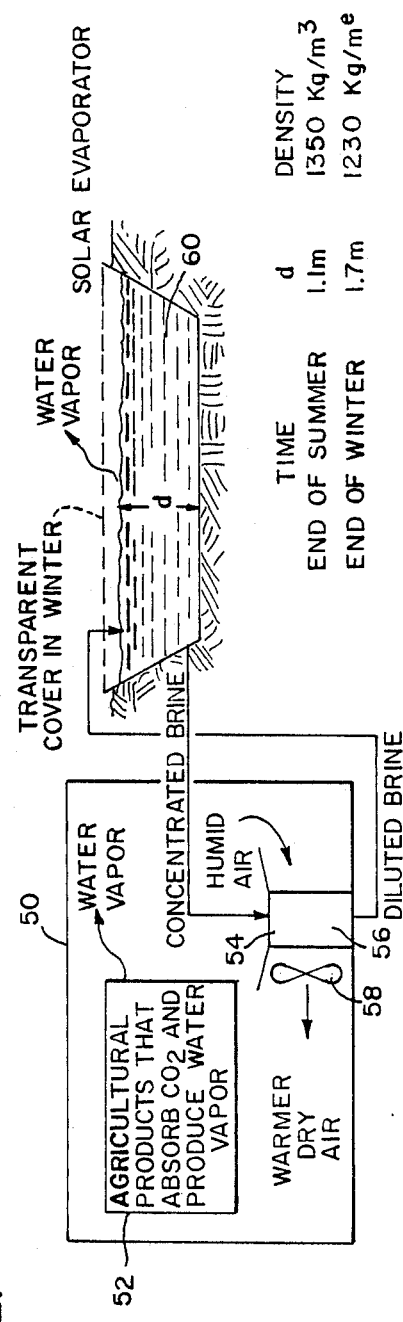
FIG. 2 is a schematic block diagram of an alternative arrangement for removing water vapor from a greenhouse and heating the greenhouse using a brine dehumidifier.

FIG. 2 is an embodiment of the invention by which a brine dehumidifier according to the present invention is used to dehumidify the air in a greenhouse and to extract and store sensible heat from the air during the day, and to give back the sensible heat to the air during the night for the purpose of heating the greenhouse. In this embodiment, regeneration of the brine is achieved on an annual basis using solar energy rather than a boiler.

Reference numeral 50 designates a greenhouse containing agricultural products 52 that produce water vapor during the day as indicated previously. Duct 54 contains brine dehumidifier 56 through which air in the greenhouse is recirculated by reason of the operation of fan 58. Dehumidifier 56 is similar to dehumidifier 16 in the sense that concentrated brine contained in a reservoir 60 is applied to the dehumidifier such that the brine and humid air come into direct contact. By reason of the hygroscopic nature of brine, water vapor in the air in the greenhouse condenses on the brine diluting the same.

During daylight hours when the temperature within the greenhouse is some 10 deg. C. higher than the temperature at night, a considerable amount of sensible heat contained in the air in the greenhouse is absorbed by the brine which increases in temperature. At the same time, the brine also absorbs the latent heat of condensation of the water vapor contained in the air. For example, if the temperature within the greenhouse during the day is about 27 deg. C. and the brine temperature at the inlet is about 25 deg. C., a 5 deg. C. increase in the brine temperature to about 30 deg. C. can occur. With a flow rate of about 30 cu.m./h per 1000 sp.m. of greenhouse area, about 1200 kWh of heat will be removed from the air and stored in the brine. The heated, diluted brine is delivered to reservoir 60.

At night, when the temperature of the greenhouse drops by about 10 deg. C., the temperature of the concentrated brine entering the dehumidifier will be about 30 deg. C.; and in this case, the sensible heat from the brine is transfered to the air which is thus heated. About 5 deg. C. temperature drop of the brine will occur; and diluted brine, at about 25 deg. C. is delivered to reservoir 60. Thus, at night, the brine will give up about the same amount of heat as was absorbed during the day.

During the beginning of the winter season, the concentration of the brine may be about 50%. After the winter season it would be diluted to about 30%. This difference in salinity represents the latent heat of condensation made available for heating during nights of the winter; and this heat must be restored to the brine in order to regenerate it. Regeneration is achieved during the summer. Reservoir 60 acts as an evaporator wherein the water vapor accumulated during the winter evaporates thereby concentrating the brine.

The advantages and improved results furnished by the methods and apparatus of the present invention are apparent from the foregoing description of the various embodiments of the invention. Various changes and modifications may be made without parting from the spirit and scope of the invention as described in the claims that follow.

What is claimed is:

1. Apparatus for controlling the condition of air in an enclosure:
    (a) a direct-contact heat exchanger;
    (b) a reservoir of concentrated brine for supplying concentrated brine to the heat exchanger;
    (c) means for recirculating air in the enclosure through the heat exchanger which produces diluted brine as the air is dehumidified;
    (d) means for returning diluted brine from the heat exchanger to the reservoir; and
    (e) an evaporating pond for evaporating water from the reservoir.

2. Apparatus for controlling the condition of air in an enclosure comprising:
    (a) a brine dehumidifier to which concentrated brine is supplied from a reservoir and from which diluted brine is obtained;
    (b) means for recirculating air in the enclosure through said brine dehumidifier;
    (c) a boiler, associated with said reservoir, fired by a combustable fuel that produces carbon dioxide and water vapor, for concentrating said diluted brine and producing steam;
    (d) means for supplying said carbon dioxide and water vapor to said enclosure; and
    (e) heat storage means to store heat contained in said steam, and selectively operable means for directing said heat in said steam either to said heat storage means or to said heat exchanger.

* * * * *